E. C. WALTER.
CALCULATING MACHINE.
APPLICATION FILED MAR. 21, 1917.
1,325,969.
Patented Dec. 23, 1919.
4 SHEETS—SHEET 3.
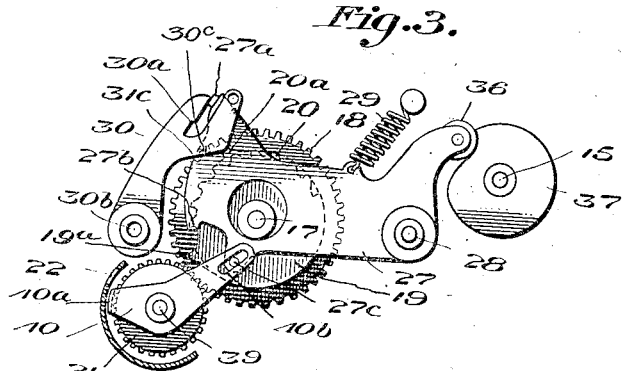
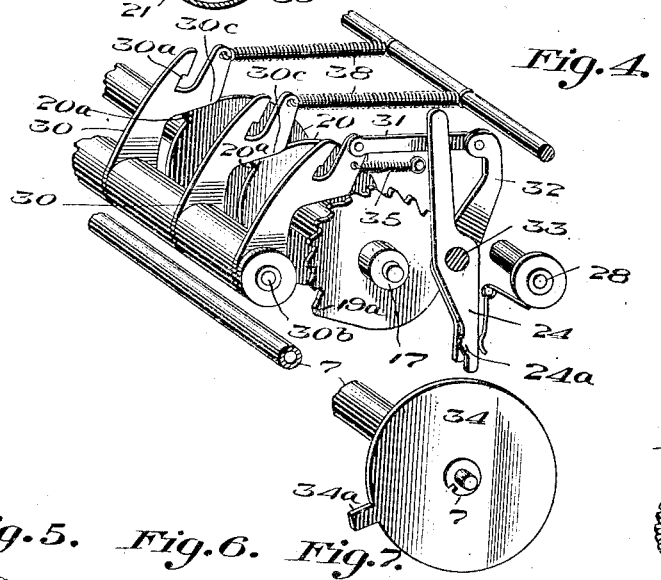
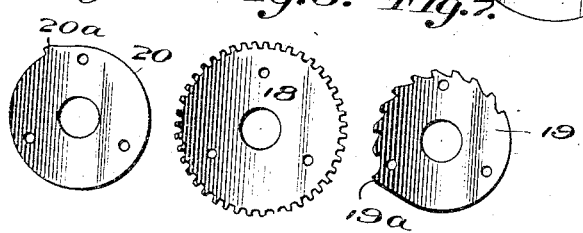
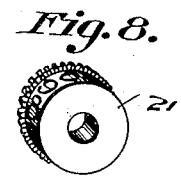
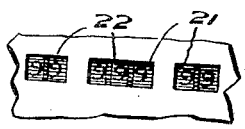
Witnesses
Inventor
Edward C. Walter

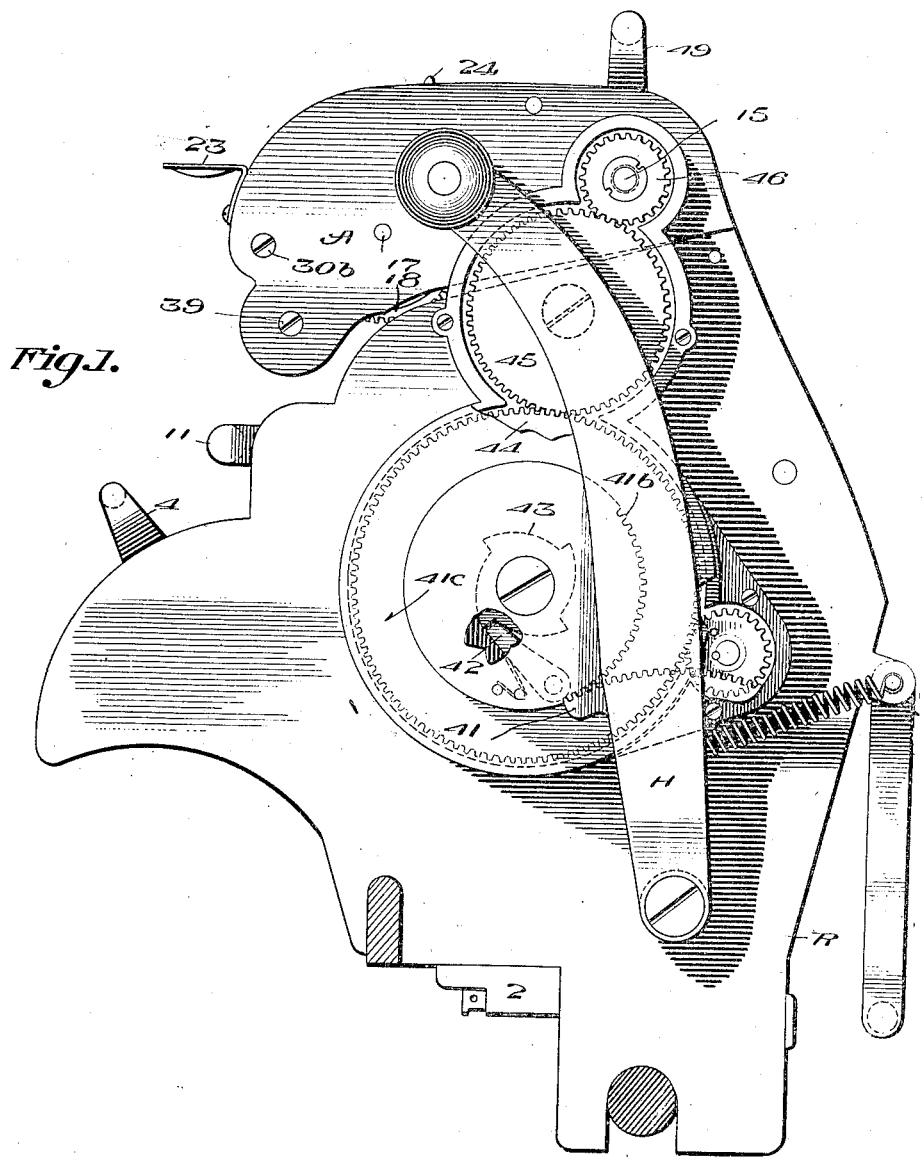

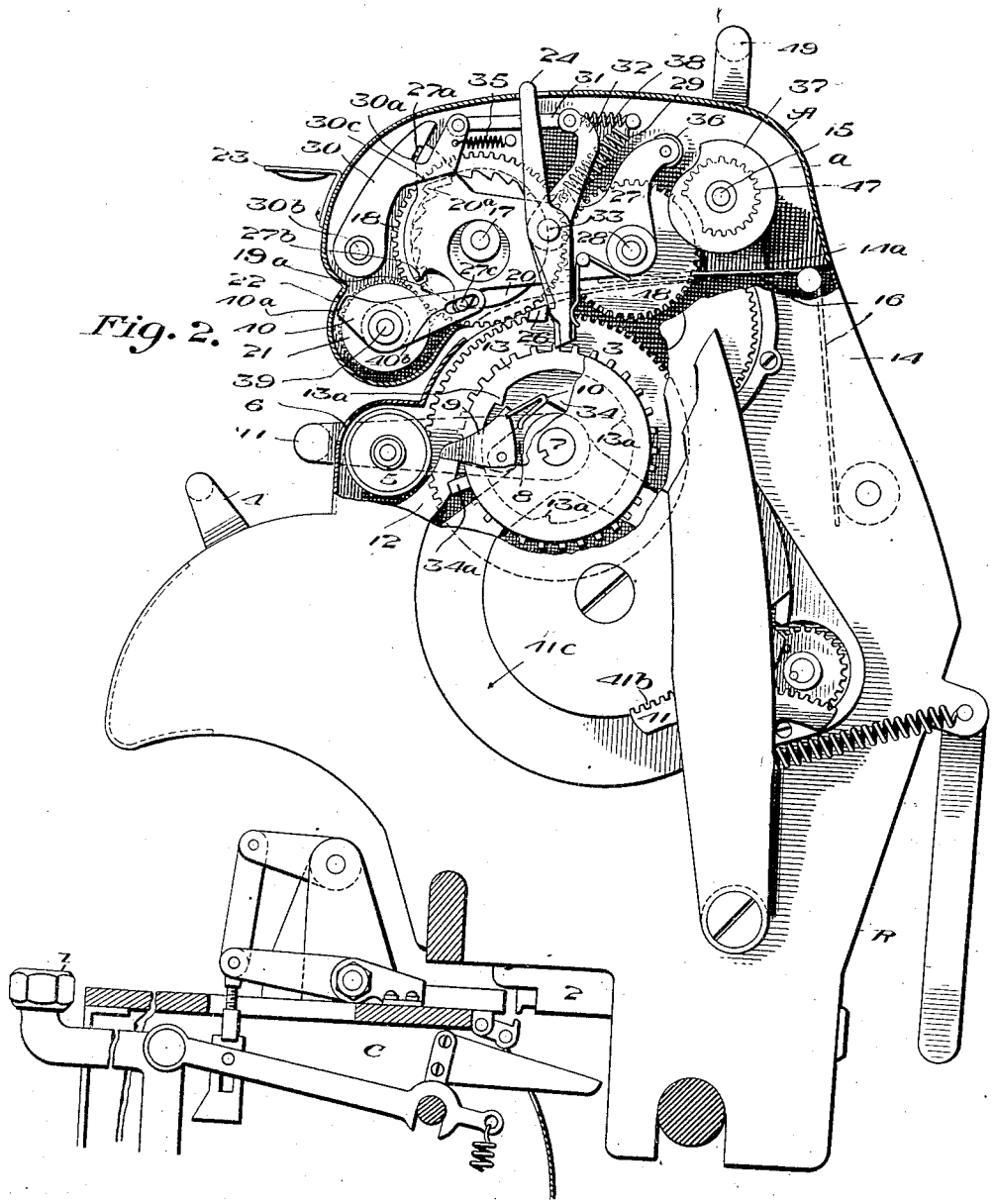

E. C. WALTER.
CALCULATING MACHINE.
APPLICATION FILED MAR. 21, 1917.

1,325,969.

Patented Dec. 23, 1919.
4 SHEETS—SHEET 4.

Witnesses

Inventor
Edward C. Walter

Atty.

UNITED STATES PATENT OFFICE.

EDWARD C. WALTER, OF NEW YORK, N. Y., ASSIGNOR TO HARRY T. AMBROSE, OF ORANGE, NEW JERSEY.

CALCULATING-MACHINE.

1,325,969.  Specification of Letters Patent.  Patented Dec. 23, 1919.

Application filed March 21, 1917. Serial No. 156,365.

*To all whom it may concern:*

Be it known that I, EDWARD C. WALTER, a citizen of the United States, residing at New York, in the county of New York and State of New York, have invented certain new and useful Improvements in Calculating-Machines, of which the following is a specification, reference being had therein to the accompanying drawing.

This invention relates primarily to calculating machines and, more particularly, to mechanism for determining the complement of a number, or that number which added to the number registered on the calculating machine will automatically raise the same to one unit higher than the normal capacity of the machine, so that all the figure-wheels will register zeros.

Bookkeeping, bank, and statement work often shows a condition which is termed a "credit balance", "overdraft", etc.; and which condition will herein be termed "the amount below zero". It is herein shown on the machine as the complement of the negative number. Therefore, if in making out a bank statement the account appears as overdrawn, the calculating machine (embodying my invention) will register an amount which is the complement of the negative number, and the amount overdrawn would be the negative number or the amount sufficient, by adding, to make the calculating machine register zero. It is, therefore, an object of the present invention to provide a structure for effecting this result.

The determination of the negative number, which is the complement of the number showing, is accomplished by means actuated by the calculating machine when the same is operated by the zero-producer to produce zeros thereon, as will hereinafter be explained.

The device involving such means is normally out of operative connection or engagement with the calculating machine, but is mounted on the same in such manner that it may quickly be positioned into operative engagement therewith and be operated thereby. This arrangement relieves the calculating machine of the burden of operating the device except when desirable and, thus, only while the same is in operative engagement therewith.

The present embodiment of this device is shown as an attachment associated with an adding and subtracting machine, such, for example, as that disclosed in my pending application, Serial No. 637,199, which became U. S. Patent No. 1,224,872 granted May 1, 1917, and reference thereto is here made for a more complete description thereof; but this device may obviously be used in connection with other types of calculating machines, and it may also be used as a separate and distinct device in connection with mechanism wherein the false amount (or the amount below zero) may be set up so that the figure-wheels of this device may show the true or complemental number of the false amount set up.

Means are provided in the machine for resetting or returning the instrumentalities of the device to normal condition preparatory to further use; and means are likewise provided for closing the sight-opening of the machine through which the numerals on the figure-wheels are observed, except when showing a negative number.

Other features, both mechanical and practical, will be apparent from the following description of my improved mechanical construction and of its mode of operation.

In the accompanying drawings, which exemplify a practical embodiment of the device:

Figure 1 is a view in side elevation of my calculating machine provided with a complement-determining device constructed in accordance with my invention, and showing the connections between the two structures;

Fig. 2 is a view partly in side elevation (similar to Fig. 1) and partly in vertical section to show the interior of the complement-determining device and the key-connections;

Fig. 3 is a fragmentary view in elevation of a part of the structure and shows the first carry-plate thereof in raised position, and the aperture (in the complement-determining device through which the figure-wheels are observed) opened;

Fig. 4 is a fragmentary view in perspective of locks for carry-plates, of the connections between the first lock and the zero-producer mechanism of the calculating machine for unlocking the same, and of a latch for holding the complement-device in operative relation with respect to the calculating machine;

Figs. 5, 6 and 7 are detail views of parts of which the main-gears of the complement-device are composed;

Fig. 8 is a view in perspective of one of the figure-wheels;

Fig. 9 is a fragmentary view in elevation of the casing and exposed peripheries of the figure-wheels.

Figure 10:
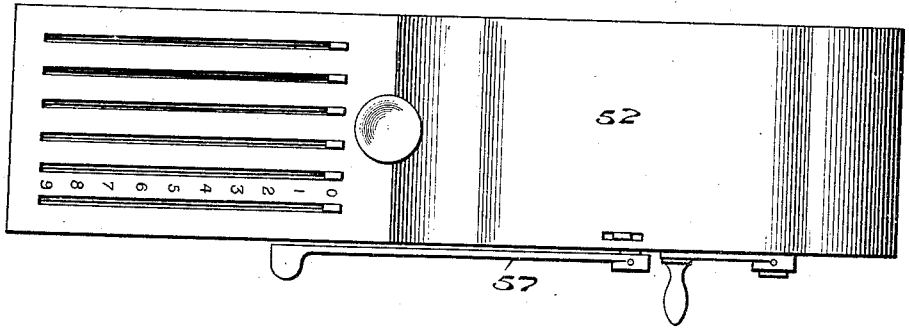
Figs. 10 and 11 are views in plan and in vertical section of a modified form of machine.

The calculating machine, described in my aforementioned application, is adapted to produce additive and subtractive computations. These computations are produced by normally rotating figure-wheels in one direction when adding and in the opposite direction when subtracting. Now, if these figure-wheels are rotated a distance greater than normal in a subtractive direction, the result would be an amount "below zero", and this would be distinguishable from a result "above zero" by the fact that there would be "nines" showing on the series of figure-wheels to the left of that amount which I will call the "false number" because the amount below zero has been subtracted from the amount (constituting the computing capacity of the machine) plus one, as the following shows: Assuming that the calculating machine contains eight denominational places and figure-wheels and that each is standing at zero; now, if the machine is operated to subtract "3 75", the figure-wheels of the machine will show an amount which is "below zero"; for example:

```
   000 000 00
         3 75 = amount subtracted.
   999 996 25 = "false number".
```

The "negative amount" or "complement" of 999 996 25 in this instance would be an amount (3 74) sufficient to require the turning of all the figure-wheels in an additive direction around to "nines" position and then the adding of "1" to the unit-column so as to cause all the wheels to be turned to "zero" position to show zeros; as

```
   999 996 25 = "false number".
         3 74⎤
   999 999 99 ⎥ = 3 75 = "complement".
           1⎦
   000 000 00
```

Now, supposing (for example) that the calculating machine, after a different computation, shows "000 005 34" and that the amount of "6 83" is then subtracted therefrom, the machine would show

```
   000 005 34
         6 83 = amount subtracted.
   999 998 51 = "false number".
```

The complement of this number would be that amount which will cause the figure-wheels to rotate in an additive direction until each shows "9", with the further adding of "1" to the unit-column. This action would cause all the carrying mechanisms of the machine to operate and turn all the wheels to zero-position; as

```
   999 998 51 = "false number".
         1 48⎤
   999 999 99 ⎥ = 1 49 = "complement".
           1⎦
   000 000 00
```

Therefore, the negative amount or the complement of the false number "999 998 51 is "1 49".

The calculating machine (as described in my aforementioned application and as in part here shown) includes a zero-producing device which, when operated, will cause the figure-wheels of the calculating machine to be rotated, in a subtracting direction, to zero, and when this movement is communicated to the figure-wheels, (which normally show "nines") they will be caused further to rotate in a ubtractive direction, whereupon the complement of the number (the amount necessary to raise the same all to "nines", which constitutes the capacity of the calculating machine), will appear thereon. As one additional unit is necessary, however, to raise this amount to "clear" the register so that it will only show zeros, means are provided for automatically causing the first figure-wheel of the complement-device to move one additional space, in an additive direction, each time the device is operated by the zero-producer of the calculating machine, and carrying mechanism is also provided for the device to effect a carrying of the tens-units from one figure-wheel to another.

The mechanical construction of my preferred embodiment (as here shown) is simple, it is easy of action, and it is certain in operation, all as will now be explained.

In Figs. 1 to 9, I have illustrated the structure as operable in conjunction with a carriage C which travels in relation to a calculator or register R. The carriage includes numeral-keys 1. These keys, when operated, transmit motion to and actuate selecting-devices 2 in the register R, and these, in turn, when operated by the pull-handle H, will (through interposed mechanism) cause rotation of gears 3 in an additive or subtractive direction, according to the position of a setting-lever 4 which controls the direction of rotation of the parts. The gears 3, which are in mesh with figure-wheels 5, will cause the same to rotate (clockwise or counter-clockwise, as the case may be) and display, through a sight-opening 6 in the register, the result of the computation.

The gears 3 are loosely mounted on a shaft 7, and on this is a series of arms 8, one of which appears in Fig. 2, and on each is fulcrumed a pawl 9. Interposed between each arm and pawl is a spring 10 which by its tension has a normal tendency to swing the pawl on its fulcrum.

Fastened on the shaft 7 is a zero-producing lever 11 which, when held in its lowermost position (as shown in Fig. 2) causes all of the pawls 9 to compress their respective springs 10 and engage the pawls with stops 12. When, however, the lever 11 is moved for the purpose of producing zeros in the calculating machine or register, the pawls 9 will be moved away from the stops 12 and the springs 10 will cause the pawls 9 to swing on their respective fulcra.

The gears 3 have fastened to their sides, at the right, a ring 13 provided with a series of three internal teeth 13ª against which the pawls 9 abut and cause rotative action of the gears 3 and of each figure-wheel 5 in a subtractive direction until all of the figure-wheels are registering zeros. It is to be understood that a wheel which is registering "nine" will be rotated nine unit-spaces, while a wheel which is registering "two" would be rotated only two unit-spaces; and so on throughout the group of wheels.

The calculating machine includes side-plates 14 and these are provided with up-standing lugs 14ª (Fig. 2), and these constitute a support for my improved complement-device, which includes a casing A, now to be described. This comprises side-plates a. The device is fulcrumed on these lugs by a shaft 15 journaled in the side-plates a and normally held in a raised position by two-membered springs 16, one of which appears in Fig. 2, and which are secured to the side-plates 14.

Loosely mounted on a shaft 17 supported in the side-plates a is a gear 18 which is provided on its right-hand side with a ratchet 19 (shown detached in Fig. 7 and in Figs. 2 and 3 partly in dotted lines) and, on the left-hand side with a disk 20 (Figs. 2 and 3) formed with a tens-carrying projection 20ª (Fig. 5). Meshing with each gear 18 is a figure-wheel 21 corresponding to the figure-wheel 5 in the register. The denominational numerals or figures are imprinted on the periphery of each wheel, as shown in Figs. 8 and 9, and the numeral "nine" normally appears through a sight-opening 22 in this device.

The device A is equipped with a button 23 upon which the operator presses when it is desired to position the complement-device into operative engagement with the calculating machine. When so depressed, the gears 18 of the complement-device mesh with the gears 3 of the register and are held in mesh therewith by a spring-pressed latch 24 which engages a projection 26 (Fig. 2) on the side-plate 14 of the calculating machine. The upper end of the latch 24 projects through and beyond the casing of the complement-device and affords one means by which the device may be unlocked from the calculating machine. When so unlocked, the spring 16 which engages the underside of the casing of the complement-device is free to tilt the same out of operative engagement with the calculating machine.

From the foregoing, it will be apparent that should the calculating machine be showing a "false" number and it be desired to determine what is the negative or complement number thereof, this can be accomplished by positioning the complement-device (in the manner already explained) into operative engagement with the calculating machine and then by returning the figure-wheels 5 thereof to zero by effecting action of the lever 11, arms 8, and pawls 9 so that the gears 3 may severally be rotated distances equal in unit-spaces to the amount showing on the respective figure-wheels of the calculating machine. The gears 18 of the complement-device, being in mesh with the gears 3, will be rotated a corresponding extent and, thus, the figure-wheels 21 of the complement-device will be correspondingly rotated in a subtractive direction and, as these figure-wheels normally stand at "nines," they will then show the negative number which is the complement of the number that was appearing on the figure-wheels 5 in the calculating machine. In other words, there will be shown on each figure-wheel of the complement-device the difference between "nine" and the number that was showing on the corresponding figure-wheel 5 of the calculating machine: If the calculating machine contains, for example, eight denominational places or figure-wheels and they are showing 999 999 25, and if, then, the complement-device is placed into operative connection therewith and the zero-producer lever 11 of the calculating machine is operated to return its figure-wheels 5 to zero, the first-wheel at the right would move five unit-spaces and, at the same time, the first unit-wheel 21 of the complement-device would (as it normally stands at nine) be moved five unit-spaces in a subtractive direction. This will cause "4" to be presented to view, and the second figure-wheel will also be moved two unit-spaces which, deducted from nine, would cause the "7" to appear; and then the third, fourth, fifth, etc., wheels would be moved nine unit-spaces. This would cause all the corresponding wheels of the complement-device to be rotated from "9" to "0." Thus, at the completion of the movement of the zero-producer lever 11, in this particular example, the complement-device would show the amount of 000 000 74, or the difference in amount between the "false" figure showing on the calculating machine and the capacity thereof, which is 999 999 99.

To obtain the negative or true complement number in any instance, the first wheel (at the right) of the complement-device must then be rotated one additional unit-space in an additive direction, after the false number has been subtracted from all nines of the complement-device, and this is accomplished by the following mechanism: Adjacent the right-hand side of each ratchet 19 is a carrying plate 27 fulcrumed on a shaft 28 journaled in the casing of the device. Attached to each of these plates is a spring 29 of sufficient strength to raise the plates and effect a turning of the connected parts. The forward end of each of the plates is provided with two projections $27^a$ and $27^b$. The upper projection $27^a$ extends toward the right (as viewed in Fig. 3) and is adapted to enter a recess $30^a$ in a lever 30 (supported on a shaft $30^b$) and hold the plate in a lowered position against the action of the spring 29. The lower projection, $27^b$, on each plate extends to the left and is adapted to engage with the teeth of the ratchet 19 to move the same when the plate is released from the recess or notch $30^a$ in lever 30. The first lever 30 at the right (as viewed in Fig. 4) has connected to its upper end a link 31 attached to the upper end of an arm 32 which, in turn, is fulcrumed on a stud 33 in the casing. The lower end of the arm 32 lies in the path of movement of a projection $34^a$ on a disk 34 keyed on the shaft 7 and rotatable with the same when the zero-producer lever 11 is operated. A light spring 35 attached to the lever 30 and to the casing will cause the lever to abut normally against the upper projection $27^a$. The lower end of the latch 24 also lies in the path of movement of the projection $34^a$ on the disk 34 and is adapted to be moved by the same. Therefore, assuming, as in the last example given, that the lever 11 has been operated to produce zeros in the calculating machine and that this action has produced the complement of the "false" number, to the extent of the capacity of the machine, then the projection $34^a$, having approached and engaged the lower ends of the latch 24 and the arm 32, will move the same to such an extent that just as soon as the zero-producer has completed its operation it willl cause the hook $24^a$ of the latch to release the complement device and the spring 16 will raise the same. Simultaneously, the arm 32 will have been moved to such an extent that the notch $27^a$ will release the plate 27 and the spring 29 will then raise the same.

While the plate 27 is rising, the projection $27^b$ will engage one of the teeth of the ratchet 19 and rotate the latter one unit-space in a direction opposite to that in which it was moving when rotated by the zero-producer of the calculating machine. The projection $27^b$, when in engagement with a tooth of the ratchet 19, will hold the same from overthrowing.

The tens-carrying projections $20^a$ on the disks 20 are positioned adjacent cammed portions $30^c$ of the levers 30 when the figure-wheels of their denominational section are standing at "nine". Should, however, any of these projections pass under its respective lever 30, the plate 27 (being held by the notch thereof) will be released therefrom and the spring 29 attached thereto will cause it to rise so that its lower projection will engage a tooth of the gear to the left of the one under operation and cause rotation thereof and of its figure-wheel to the left one unit-space. Now, should the adding of this unit-space to the wheel to the left cause the release of the plate for that denominational position, then, the next gear and wheel to the left will also be moved one unit-space; and this action of carrying the tens units will be successive from one denominational position to another.

The rear portions of the plates 27 are provided with rollers 36 which will, when the plates are released from the notches, be moved into the path of movement of a cam 37. This cam 37, when revolved, will return the plates to normal position and the notches $30^a$ will again hold them until released. Light coil springs 38 are adapted to hold the arms 30 (for the plates of all denominational positions except the unit position) against the projections $27^a$.

Fulcrumed on a figure-wheel supporting shaft 39 is a shield 40 which has an angulated portion $40^a$ extending across all the figure-wheels and normally is directly back of the sight-opening 22 to cover the figures on the figure-wheels. Another portion of the shield is provided with a slot $40^b$ in which operates a pin $27^c$ on the first plate 27 to cause movement of the shield each time that the first plate 27 rises, and action occurs every time the device is being operated. The downward movement of the shield 40 opens the sight-opening and exhibits to view the numerals of the negative number. When the first plate is returned to normal position, the sight-opening is again closed.

Means are also provided for returning the actuated parts to normal position after each operation of the device and preparatory to another operation thereof: In the first place, it is to be noted that the first movement of the pull-handle H, after an operation of the device for determining a negative number, will return the parts to normal position in the following manner: The handle (through a segment 41, gear 41$^b$ and disk 41$^c$) operates a pawl 42 and a ratchet 43 and causes a gear 44 to rotate one-quarter of a turn on each operation thereof. Meshing with gear 44 is an intermediate gear 45 which, in turn, meshes with a gear 46 fast on the end of the shaft 15. The gears are so dimensioned that operation of the pull-handle will cause complete rotation of the shaft 15.

It is to be understood that the shaft 15 carries a cam 37 for each plate 27, and also a mutilated gear 47 for every denominational position contained in the device. Meshing with the gears 18 and adapted to be rotated by the same are mutilated gears 48. These gears 47 and 48 are in alinement and are so relatively positioned in respect to the mutilated sections thereof, that the gears 48 may be rotated without colliding with gears 47. Rotation of the shaft 15 will cause the cams 37 to return the plates 27 to normal position and cause the toothed sections of the gears 47 and 48 to mesh and return the gears 48 and, consequently, the figure-wheels to normal position.

If any of the figure-wheels shall have been rotated in an additive direction from "9" to "0," the projection 27$^b$ on the plate 27 for that figure-wheel will (when being returned by the cam 37) abut against the projection 19$^a$ on the plate 19 and return the figure-wheel in a subtractive direction to normal position or that position wherein the numeral "9" is directly back of the sight-opening 22.

In lieu of the described connection between the handle H and the shaft 15 for resetting the device to normal position, a lever 49 (Fig. 1) may be secured to the outer end of the shaft 15 so that a complete revolution of the same will operate the related parts and accomplish the same functions thereof as when actuated by the handle H.

Having explained the operation of the various parts of the structure, the adaptability of the device to commercial purposes will now be briefly stated:

Having completed a computation on the calculating machine, if the result thereof is "below zero" and it be desired to ascertain the negative number, the complement of the "false" number registered thereby, the operator by the button 23, moves the device into operative relation to the calculating machine and then operates the zero-producer lever 11 of the latter. This action transforms the "false" number, or the complement of the negative number, into the true or negative number—which number will then appear through the sight-opening of the complement-device—and releases the device from operative engagement with the calculating machine. Subsequent operation of the pull-handle of the calculating machine resets the complement-device and prepares it for determining another complement number.

Figure 11:
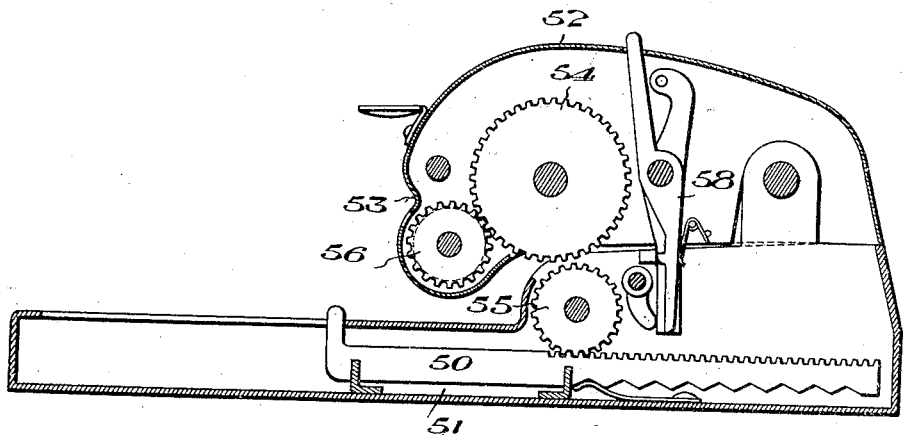

While the features of this invention are presented in the foregoing as applied to one form of calculating machine, for the purpose of illustration, it is to be understood that various changes may be made without departing from the principle and spirit of the invention to make the same applicable to other designs of machines: For instance, Figs. 10 and 11 illustrate an embodiment wherein operating keys or slides 50 are housed within a casing 51, a casing 52 of the complement-device 53 being positionable in relation thereto, as in the structure already described: Normally, all of the slides 50 stand at zero-position: The operator presses the casing 52 downward to engage a gear 54—corresponding to the afore-mentioned gear 18 in the principal embodiment—with a pinion 55 which is operated by the rack on the slide 50. The gear 54 meshes with a number-wheel 56. Each of the slides 50 normally stands at zero-position, as stated, and the wheel 56 will show "9." When the operator actuates one or more of the slides to bring the selected number into position, the complement of this number will be made to show on the number-wheels. If, then, an unlocking lever 57 is operated to actuate a latch 58,—similar to the latch 24—this action will add the additional unit necessary to make the correct amount and effect a release of the gear 54 from engagement with the pinion 55, similarly as in the first structure described.

The invention, as herein disclosed, involves the structure described and, also, the method practised in connection therein; and to both the structure and method I herein make claim.

What I claim is:

1. In combination, an adding-and-subtracting machine and a complement-determining device, the machine and device each including a set of figure-wheels, one set being adapted to be operated independently of the operation of the other set; the figure-wheels of the device normally standing at "nines" until brought into connection with and operated by the figure-wheels of the machine to produce the complement of a number on the wheels of the device when said number is subtracted from the wheels of the machine, and means for automatically adding one unit to the wheels of the device after the wheels of the machine have completed their action and after the wheels of the machine have been disconnected from the wheels of the device.

2. In combination, an adding-and-subtracting machine and a complement-determining device, each provided with a set of figure-wheels, one set being operable independently of action of the other set, zero-producing mechanism for the machine for rotating its wheels in a subtractive direction toward their zero-position, means for rotating the wheels of the device in a subtractive direction when the zero-producing mechanism is operated, and means operable by the zero-producing mechanism to reverse the direction of rotation of the wheels of the device to complete the complement-determining operation.

3. In combination, keys for setting up a number, a complement-determining device associated therewith and including figure-wheels operable thereby to rotate the wheels of the device in a subtractive direction for producing, within one unit, the complement of the number set up on the keys and including also a unit figure-wheel, and an instrumentality operable to disconnect the keys and figure-wheels and for reversing rotation of the unit figure-wheel to produce the actual, required complement.

4. In combination, a calculating machine including zero-producing mechanism for eliminating numbers set up in the machine, a complement-determining device associated with the machine and actuatable by the zero-producing mechanism to produce, within one unit, the complement of the number eliminated by the machine during the action of the zero-producing mechanism and including a unit-wheel, and means releasable by the zero-producing mechanism to rotate the unit-wheel of the complement-determining device one unit-space in a direction opposite to that in which it is rotated by the zero-producing mechanism before being released therefrom to produce the required complement-number.

5. In combination, a calculating machine, a complement-determining device comprising a unit-wheel, the machine and device each including a series of figure-wheels and each series being independently rotatable, the wheels of the calculating machine producing the result of additive and subtractive computations while the wheels of the device remain stationary, means for connecting the two series of wheels, means for effecting rotation of the unit-wheel of the device, means for rotating the connected wheels in a subtractive direction until a zero-position is produced on the wheels of the machine and, then, disconnecting the series of wheels and releasing the unit-wheel rotating means for causing rotation of the unit-wheel in an additive direction, and means for effecting rotation of all of the wheels of the device in an additive direction until the "nines" position thereof is attained.

6. In combination, a calculating machine including a series of figure-wheels on which a number may be set up, a complement-determining device including a series of figure-wheels and a unit-wheel, the wheels of the machine being alternately rotatable in opposite directions independent of the action of the wheels of the device, means interposed between both series of wheels for moving them either simultaneously or independently and, when moved simultaneously, to disconnect the wheels one series from the other, and means releasable thereby for rotating the wheels of the device independently of the wheels of the calculating machine; said operations causing the figure-wheels of the device to exhibit to view the complement of a number previously set up in the calculating machine.

7. In combination, a calculating machine including a series of figure-wheels, a complement-determining device also including a series of figure-wheels and a unit-wheel, the figure-wheels of the machine being operable in either direction for setting up the result of additive and subtractive computations independently of the action of the wheels of the device, means for connecting the two series of wheels for simultaneous rotation, means for rotating both series of wheels in a subtractive direction and for disconnecting the connected series, means for subsequently rotating the unit-wheel one unit-space in an additive direction, and means for moving each wheel of the series one unit-space in an additive direction.

8. A structure including two series of figure-wheels, each rotatable independently in two directions, one of the series normally presenting to view the "nines" number inscribed thereon while the other series presents to view the result of additive and subtractive computations, means for connecting the two series for simultaneous rotation, means for actuating the connecting means to rotate both series in a subtractive direction, said actuating means also disconnecting one series from the other, and means releasable by the disconnecting means for rotating one wheel of one series in an additive direction, means for effecting rotation of all of the wheels of the disconnected series in an additive direction, and independent means for effecting action of the wheels of both series in an additive direction.

9. A calculating machine including an actuating lever and zero-producing mechanism, in combination with a complement-determining device associated therewith and positionable into operative relation thereto, the machine and device each including a series of figure-wheels rotatable in a subtractive direction by operation of the zero-producing mechanism, means for connecting the wheels of the machine and device, mechanism releasable by the action of the zero-producing mechanism to disconnect the two series of figure-wheels, means releasable by the action of the zero-producing mechanism for causing independent rotation of the wheels of the device in an additive direction to complete the complement-determining operation, and means operable by the actuating lever for re-setting the parts into normal position.

10. In combination, a calculating machine including a set of figure-wheels rotatable in one direction for producing additive computations and in the opposite direction for producing subtractive computations, said wheels displaying to view the complement of a negative number whenever they have been rotated a distance greater in a subtractive than in an additive direction, a complement-determining device connectible with the calculating machine and including a set of figure-wheels normally disconnected from the figure-wheels of the calculating machine and remaining stationary when the wheels of the machine are producing the complement of a number and connectible thereafter with the wheels of the machine and rotatable simultaneously therewith, said complement-determining device also including a unit-wheel, zero-producing mechanism in the calculating machine and operable to rotate its figure-wheels in a subtractive direction toward zero-position and also to rotate the figure-wheels of the device in a subtractive direction an equal extent to produce, within one unit, the negative number, two arms carried by the device and shiftable by the zero-producing mechanism after such mechanism has rotated the figure-wheels, a spring-actuated plate, and an arm for actuating the plate; one of the aforementioned two arms operating, when shifted, to release the complement-determining device from operative connection with the calculating machine, and the other connected to and operating the arm for releasing the spring-actuated plate, the latter operating to rotate the unit-wheel of the device one unit-space in an additive direction and thereby producing the aforementioned negative number.

11. In combination, a calculating machine and a complement-determining device fulcrumed on the calculating machine and normally out of operating connection therewith but movable into connection with the same, zero-producing mechanism for the calculating machine, a locking instrumentality for holding the device in operative connection with the calculating machine and having one end disposed in the path of movement of the zero-producer and shiftable thereby for releasing the device and disconnecting the same from the machine, a double-ended arm fulcrumed on the device and having one end in the path of movement of the zero-producer and shiftable thereby, a notched arm, a link for connecting the other end of the double-ended arm to the notched arm, a spring-actuated plate provided with a plurality of projections, a ratchet associated with the plate, one of the projections on the plate being adapted to enter the notch in the notched arm and to hold the same until released by the shifting of the double-ended arm, another projection on the plate being adapted to engage a tooth of the ratchet to rotate the same.

12. In combination, in a calculating machine, a series of figure-wheels, a series of gears for operating the same, a series of mutilated gears in mesh with said gears and rotatable by the same, and a second series of mutilated gears lying substantially in the same plane as the first series and normally out of mesh therewith but adapted when the second set is rotated to mesh with the other series and to be rotated to normal position by the second series.

13. In combination, in a calculating machine, a set of figure-wheels, a set of gears constantly in mesh therewith for rotating the same in either direction, a complement-determining device fulcrumed on the calculating machine and including a series of gears adapted to be positioned in mesh with the gears of the machine, a series of figure-wheels meshed with the series of gears in the device, each gear therefor having a ratchet provided with a projection, a spring-actuated plate provided with a projection adapted, when the plate is shifted in one direction, to enter a tooth of the ratchet and, when shifted in the opposite direction, to abut against the projection on the ratchet.

14. The combination in a calculating machine including additive-producing instrumentalities, of a device tiltably attached thereto and tiltable in relation therewith, of a spring for tilting the device away from the calculating machine, a latch for holding the device in operative relation with said calculating machine against action of the spring, means for moving the latch to release the device and permit the spring to tilt the device out of operative relation with the calculating machine, said means also operating simultaneously to effect release of the additive-producing instrumentalities of the device, and means for actuating said instrumentalities to cause an additive computation to be performed thereby.

15. The combination of operating keys, a calculating machine associated therewith and actuatable thereby to effect a selection in the machine and including wheels rotatable either in an additive or a subtractive direction, selecting means in the machine, operating means for causing the selecting means to effect a computation, means for eliminating the result of the computations from the calculating machine, releasable means operatively associated therewith, a complement-device operatively associated with the calculating machine and receiving movement from the same for exhibiting the complement of said result when the result of the computations is being eliminated, said eliminating means also operating to release the device from operative relation with the calculating machine and to actuate the releasable means for causing the wheels to be rotated in an additive direction to complete the required complement; and means connecting with the operating means for removing the complement number from the complement-device.

16. In a device of the kind described including a figure-wheel and provided with an aperture through which the figures on the wheel may be observed, a shield for closing the aperture, a lever provided with a notch, a plate provided with a projection adapted to enter the notch and be held thereby in a lowered position, a spring connected to the plate for raising the same when released from the notch, and a connection between the shield and plate whereby the former will be moved away from the aperture whenever the plate is raised.

17. A typewriter-operated computing machine including figure-wheels, gears for rotating the wheels in opposite directions, ratchets attached to the gears, a lever, connections for engaging the teeth of the ratchet to turn the gears and figure-wheels in one direction, gears normally out of mesh with the wheel-rotating gears but engageable therewith for operation thereby when under control of the lever and connections, figure-wheels in operative connection with the normally disconnected gears, both sets of figure-wheels being rotatable in a subtractive direction when the lever and connections are operated, a disk attached to the lever, and a plurality of spring-pressed arms lying in the path of movement of the disk and movable thereby when the lever is operated.

18. The combination in a device of the kind described, of a chain of mechanism comprising a figure-wheel, a gear for rotating the same in either direction, a mutilated gear in mesh with said gear for moving the same in one direction, a cam-actuated plate for moving the gear in the opposite direction, and a mutilated gear normally out of mesh with the first-mentioned mutilated gear but rotatable into mesh therewith for causing its rotation.

19. In combination, a calculating machine including figure-wheels and zero-producing mechanism, and a device including figure-wheels normally disconnected from the wheels of the calculating machine, a spring-actuated plate for each figure-wheel of the device, a notched arm for holding the plate in a lowered position, a link connected to the arm, a double-ended arm fulcrumed on the device and connected to the link, a projection on the zero-producing device for abutting against the arm and, when shifted by the same, tending to release the spring-actuated plate whereby it will move a figure-wheel of the device, and "tens"-carrying mechanism for transferring the "tens" units from one figure-wheel to another and comprising a spring-actuated plate and a notched arm.

20. A calculating machine including figure-wheels and zero-producing mechanism for rotating the wheels in a subtractive direction toward zero position when the wheels stand at numbers other than zero, in combination with a complement-determining device including figure-wheels which stand at "nines" when any number shows on the figure-wheels of the calculating machine, intermediate mechanism between the figure-wheels of the machine and the device and operable by the zero-producing mechanism for rotating both sets of wheels in a subtractive direction to zero to reduce the amount showing on the calculating machine and also to reduce the amount showing on the wheels of the device an equal amount, and means for moving one wheel of the device one unit-space in an additive direction and independently of the operation of any of the wheels of the calculating machine.

21. A calculating machine including a series of figure-wheels and a unit-wheel, in combination with a complement-determining device also including a series of figure-wheels normally standing at "nines" position, means for simultaneously rotating both sets of wheels in a subtractive direction until the wheels are simultaneously displaying zeros, automatically-operated means for then disconnecting the two series of wheels for independent movement, and means for thereafter automatically causing rotation of the unit-wheel of the complement-determining device one unit-space in an additive direction to complete the complement-determining operation.

22. In combination, a complement-determining device, a calculating-machine associated therewith and including zero-producing mechanism, means for maintaining said device and machine in coöperative relation, means for releasing said maintaining-means while the calculating machine is being operated except under the action of the zero-producing mechanism, and means for actuating the device and machine out of coöperative relation.

23. In combination, an adding and subtracting machine and an associated complement-determining device, the machine and device each including a set of figure-wheels, and means for effecting a cycle of movements for producing the required complement of a number showing on the figure-wheels of the calculating machine, said cycle of movements involving, first, the rotation of the two sets in a subtractive direction and, then, the rotation of one of the sets in an additive direction, to produce the required complement-number on the figure-wheels of the complement-determining device.

In testimony whereof I affix my signature in presence of two witnesses.

EDWARD C. WALTER.

Witnesses:
 GEO. W. DOWNING,
 ADOLPHE BOURGUIGNON.